United States Patent [19]

Lambert

[11] Patent Number: 4,713,970
[45] Date of Patent: Dec. 22, 1987

[54] THERMAL DIFFUSION FLUID FLOW SENSOR

[75] Inventor: David K. Lambert, Sterling Heights, Mich.

[73] Assignee: General Motors Corporation, Detroit, Mich.

[21] Appl. No.: 838,929

[22] Filed: Mar. 12, 1986

Related U.S. Application Data

[63] Continuation-in-part of Ser. No. 645,253, Aug. 29, 1984, Pat. No. 4,576,050.

[51] Int. Cl.⁴ .......................... G01F 1/68; G01P 5/10
[52] U.S. Cl. ................................ 73/861.05; 73/204
[58] Field of Search ............................. 73/204, 861.05

[56] References Cited

U.S. PATENT DOCUMENTS 4,332,157  6/1982  Zemal et al. .
4,373,386  2/1983  Schuddemat et al. .
4,483,200  11/1984  Togawa et al. .
4,502,339  3/1985  Horn .
4,561,303  12/1985  McCarthy ........................ 73/204

Primary Examiner—Herbert Goldstein
Attorney, Agent, or Firm—Warren D. Hill

[57] ABSTRACT

A miniature solid state fluid flow sensor has a low diffusivity substrate, such as a polymer film, which is optionally mounted on a thermally conductive base. A resistor strip on the substrate is connected to an electrical oscillator and thus emits thermal waves which are propagated through the fluid at a rate dependent on a fluid flow component perpendicular to the strip. A thermoelectric detector, spaced from one side or each side of the strip, senses the thermal waves; and detector circuitry determines the time or phase shift due to fluid flow.

A reference sensor is positioned relative to the primary flow sensor to compensate for the effects of pressure and temperature changes and uses properties of symmetry to assure low sensitivity to variations in the direction of fluid flow.

7 Claims, 11 Drawing Figures

THERMAL DIFFUSION FLUID FLOW SENSOR

This is a continuation-in-part of U.S. Ser. No. 645,253, filed Aug. 29, 1984, now U.S. Pat. No. 4,576,050.

FIELD OF THE INVENTION

This invention relates to a fluid flow sensor and particularly to such a sensor responsive to thermal signals propagated through the fluid.

Many types of fluid flow sensors have been proposed which cumulatively represent a great variety of advantages and disadvantages. For example, there are wide ranges of size, expense, accuracy, response, power requirements, and durability. In addition, certain sensors are suitable only for limited types of fluids, or for limited temperature ranges. Some sensors are responsive only to fluid velocity, while others respond to fluid mass flow. For the application of measuring mass air flow of automotive engine induction air, it is desirable that the sensor respond to mass air flow and it is required that the sensor be rugged and durable and useful throughout a wide temperature range and a wide dynamic flow range.

Flow sensors which respond to thermal properties usually operate on the basis of measuring the cooling effect of a flowing fluid on a heated solid. These sensors have taken many forms including hot wire and thin film air flow sensors which have been applied to the mass air flow measurement of engine induction air. An example of the latter is disclosed in U.S. Pat. No. 4,433,576 Shih et al; an example of a miniature solid state air flow sensor is the pyroelectric anemometer shown in U.S. Pat. No. 4,332,157 Zemel et al. In the Zemel et al device, temperature oscillations flowing primarily through a solid substrate cause temperature variations which depend on the cooling effect of the air flow on the substrate. Very slow response times are reported for the pyroelectric device. Still another temperature responsive air flow device is the pulsed hot wire anemometer which measures air flow using the time difference between the heating of one wire and the detection of the resulting burst of hot air by a resistance change in a second wire spaced from the first. While this is based on the propagation of thermal signals through the air and thus is closely related to the present invention, it requires thin wires which are fragile and which are difficult to assemble in a reproducible way.

My previous invention, represented by U.S. Pat. No. 4,576,050, successfully overcame the drawbacks recited above. That disclosure includes a solid state fluid flow sensor having a substrate with a thermal diffusivity less than that of the fluid being measured, a source of thermal oscillations and detector of thermal oscillations on the substrate surface such that thermal oscillation signals are propagated through the fluid between the source and detector, and circuitry for measuring the time of arrival or phase of the signal from the detector relative to a suitable reference, which time or phase correlates to the fluid flow near the substrate surface. A particular feature of the original disclosure is the reference sensor of FIG. 8 which provides compensation for the effect of changes in fluid temperature and pressure. It has been found that this reference sensor is most effective when the direction of fluid flow is parallel to the reference source and that errors are introduced into the reference signal when the flow has a velocity component perpendicular to the reference source. While the nominal flow direction is, in many applications, substantially controlled, it is preferred that a sensor be able to accommodate small variations from the nominal flow direction without introducing objectionable errors.

SUMMARY OF THE INVENTION

It is therefore an object of the invention to provide a fluid flow sensor compensated for changes in fluid temperature and pressure and which has low sensitivity to variations in the direction of fluid flow.

The invention is carried out by a fluid flow sensor for location contiguous to a body of fluid subject to flow to be measured, comprising: a thin film substrate having a thermal diffusivity substantially less than that of the fluid; a thermally conductive base supporting the substrate; thermal oscillation means on the surface of the substrate for generating thermal oscillations in the fluid, whereby thermal oscillations are propagated through the fluid at a rate dependent on fluid flow to substrate surface locations spaced from the oscillation means; first and second thermal oscillation detector means on the substrate surface equally spaced from the oscillation means for providing signals corresponding to the thermal oscillations at the detector means; the oscillation means and each detector means being arranged relative to one another and to the nominal direction of flow so that the detector outputs are substantially insensitive to small changes in flow direction, and signal responsive means coupled to the first and second detector means for producing an output correlated to the fluid flow near the substrate surface, which output is substantially independent of small variations in air flow direction from the nominal direction.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

While the fluid flow sensor described herein is generally applicable to gases and liquids, it is specifically described in its preferred embodiment as a mass air flow sensor. Thus, it is designed to produce an output which responds not only to air velocity across the face of the sensor, but to density as well so that for some predefined airstream the sensor output will represent mass air flow. Many aspects of this sensor are reported in the paper, "An Air Flow Sensor Based on Interface Thermal Wave Propagation" by D. K. Lambert and C. R. Harrington, J. Appl. Phys., Vol. 59, No. 1, Jan. 1, 1986, which is incorporated herein by reference.

Figure 1:
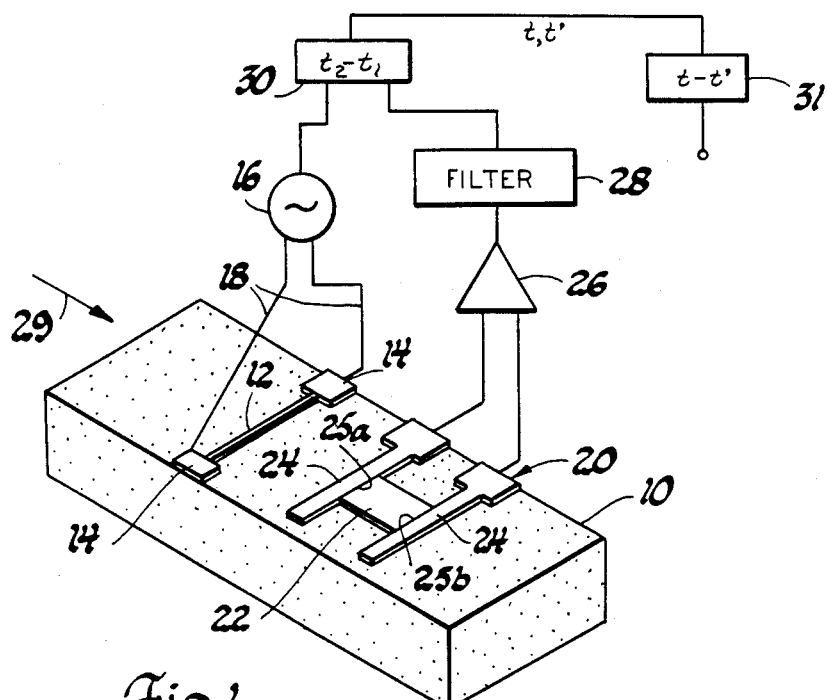
FIG. 1 is a schematic illustration of a simplified embodiment of a fluid flow sensor according to the invention.

Referring to FIG. 1, a sensor requires a substrate 10 which is a thermal and electrical insulator and which has low thermal diffusivity relative to the air or other fluid being measured. The thermal diffusivity A is defined as: $A=K/DC_p$, where K is the thermal conductivity, D is the density, and $C_p$ is the heat capacity at constant pressure. A suitable material for the substrate 10 is glass which at 20° C. has a thermal conductivity, $K=1.1\times10^{-2}$ W cm$^{-1}$ °C.$^{-1}$, and a thermal diffusivity, $A=6.9\times10^{-3}$ cm$^2$ Sec$^{-1}$. An even better substrate material is Mylar® which has the properties: $K=1.45\times10^{-3}$ W cm$^{-1}$ °C.$^{-1}$, and $A=9.3\times10^{-4}$ cm$^2$ Sec$^{-1}$. The preferred substrate is polyimide which has the properties: $K=1.55\times10^{-3}$ W cm$^{-1}$ °C.$^{-1}$, and $A=9.9\times10^{-4}$ cm$^2$ Sec$^{-1}$ at 20° C. By comparison, the thermal properties at 20° C. of air are: $K=2.61\times10^{-4}$ W cm$^{-1}$ °C.$^{-1}$, and $A=2.31\times10^{-1}$ cm$^2$ Sec$^{-1}$. Thus these substrate materials have a much lower thermal diffusivity than the air. A source of temperature oscillations in the form of a resistive strip or heater 12 extends across the surface of the substrate 10 and terminates at a conductive pad 14 at either end. An electrical oscillator 16 is connected to the terminal pads 14 by leads 18 to supply oscillating current to the resistive strip or heater 12. A detector of temperature oscillations in the form of a thermoelectric detector 20 or thermocouple is formed on the surface of the substrate 10, spaced from the resistive strip 12. The thermoelectric detector 20 comprises a thin film of material 22 having a high thermoelectric power and low resistivity and conductive strips 24. A suitable material 22 is a semi-metal such as bismuth or a bismuth-antimony alloy joined to a pair of metal (e.g., nickel) strips 24 both parallel to the resistive strip 12 contacting the surface of the semi-metal film 22 to form two spaced elongated junctions 25a and 25b with the film and to provide output terminals for the detector 20. The Seebeck effect determines the operation of the detector 20 so that an electrical signal is generated at the detector output terminals whenever the two junctions 25a and 25b of the detector are at different temperatures. A differential amplifier 26, having its inputs coupled to the metal strips 24 of the detector 20, produces an output signal whenever such a temperature differential occurs. That output signal is passed through a filter 28 which is set to pass a frequency twice that of the oscillator 16 since each sine wave cycle of the oscillator 16 will produce two heat pulses in the resistive strip 12 and will give rise to two detector output pulses. The filtered output signal and a signal from the oscillator 16 are fed to a timing circuit 30 which is sensitive to the time differential or the phase difference between the oscillator current and the detector output signal.

The rate of propagation of the thermal wave through the air from the source of temperature oscillations 12 to the detector 20 depends upon the phase velocity, $V_p$, of the temperature oscillations and the component of air velocity (indicated by arrow 29) perpendicular to the strip 12. The air velocity sensed by the device is dependent on the effective air velocity in the boundary layer and is a function of the mass air flow. A simple analysis yields the relationship of the fluid flow velocity to the time shift or phase shift caused by flow. Where R is the distance from the source 12 downstream to the first junction 25a of the detector 20, the time t for the phase front to move from the source to the detector junction 25a through still air is: $t=R/V_p$. With downstream flow velocity $V_f$, the time $t'=R/(V_p+V_f)$. The time shift then is $t-t'$; and the resulting phase shift in degrees—where f is the temperature oscillation frequency—is 360 $fRV_f/(V_p(V_p+V_f))$. The resulting function has a shape like curve shown in FIG. 2, and is characterized by a linear portion at low velocities and a nearly level portion at high velocities. The timing circuit 30 yields the value of t or t'. The FIG. 2 data is obtained by making a measurement of t in still air and making many measurements of t' at various air-flow rates. The value $t-t'$, representing time shift or the corresponding phase shift, is manually or electronically determined by a calculation at each data point, as indicated by the calculation circuit 31 of FIG. 1.

Figure 2:
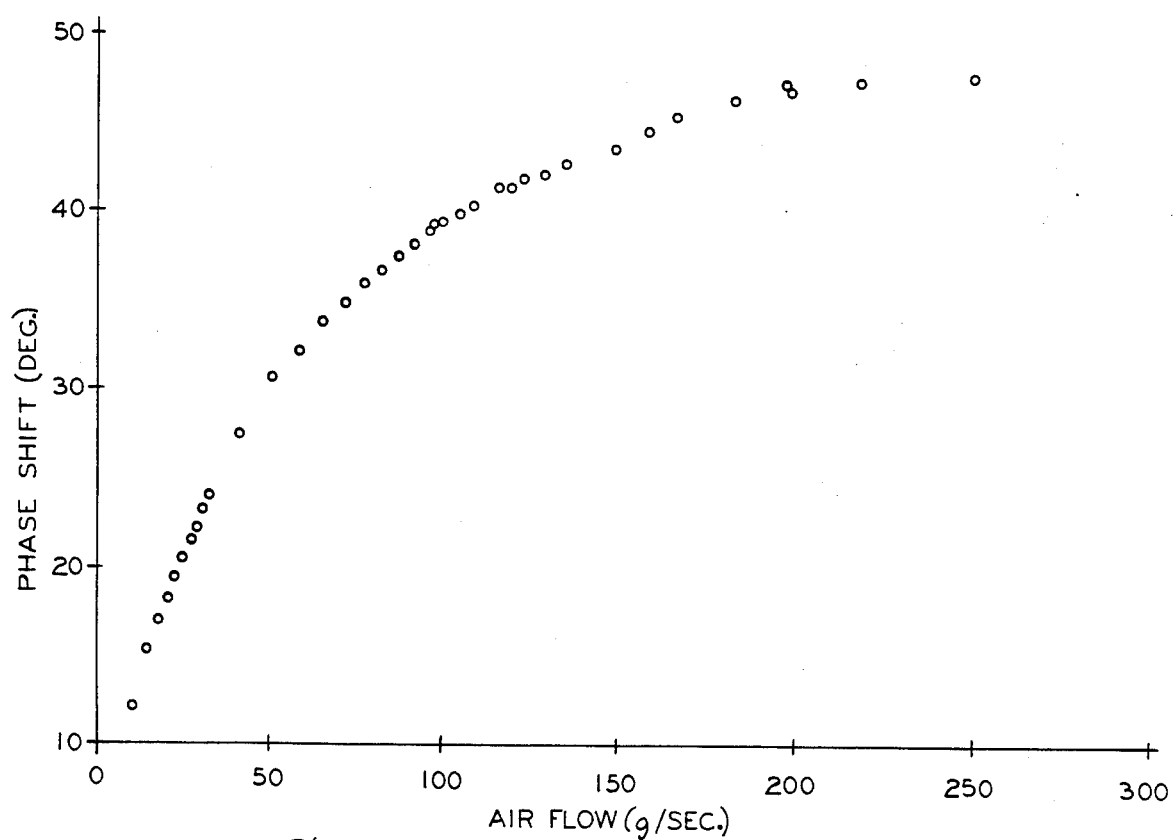
FIG. 2 is a graph of the measured phase shift vs. air flow obtained with a sensor according to the invention.

Since temperature oscillations can propagate from the source to the detector through the substrate as well as through the air, the design of the device must take that into account as a possible source of interference at the detector. Since the thermal conductivity of the substrate is typically greater than that of air, more heat will be coupled from the resistive strip 12 to the substrate than to the air so that if the detector 20 were very close to the resistive strip 12, the thermal oscillation in the substrate would be predominant over that in the air and there would be a very low signal-to-noise ratio. On the other hand, since the thermal diffusivity of the air is substantially greater than that of the substrate, the thermal oscillations in the air are much more efficiently propagated away from the source 12. The amplitude of the thermal oscillations in the air decreases with the distance R from the source, however an even greater rate of decrease occurs in the substrate so that there is a cross-over point at which the thermal oscillation effects of the air and substrate are equal; at greater distances from the source, the thermal oscillations in the air have the predominant effect. The detector 20 is preferably placed near the cross-over point; that is, the detector junction 25a nearest the thermal oscillation source 12 is sensitive to the thermal oscillations carried by the air as well as by the substrate, however, the effect of air flow on the detector output signal is measurable. The second junction 25b of the detector 20 is even farther from the source 12 and even though the detector output signal depends upon the temperature difference of the two junctions 25a, 25b, the thermal oscillations at the second junction 25b are so greatly diminished in amplitude that they cause only minor perturbations in the detector output signal. Although the measured time or phase depends on several factors in addition to the variable air flow, it is not necessary to determine the particular influence of each factor because the device is repeatable in operation. By calibrating a particular device to determine the relationship between flow and the time or phase shift of the detected signal, as shown in FIG. 2, flow measurements are thereafter readily made for that device and other devices of the same design. The above cited paper in J. Appl. Phys., especially equation (9), further reveals details on the operation and design of such devices.

Where $V_o$ is the thermocouple voltage oscillation in vacuum and $V_a$ is the same quantity in air, the ratio $V_o/V_a$ provides an indication of the thermal pulse coupling through the air and through the substrate. If $V_o/V_a=0$ all the coupling is through the air and if $V_o/V_a=1$ the two coupling modes are equal. Three conditions can be identified for a sensor with a thermally insulating layer on a thermally conducting base:

(1) At low frequencies, $V_o/V_a < 1$ and is constant as a function of frequency.

(2) At intermediate frequencies, if the thermally insulating layer is thick, interference between the thermal waves that propagate through the air and through the substrate can lead to cancellation between them, so $V_o/V_a$ rises to a peak.

Figure 8:
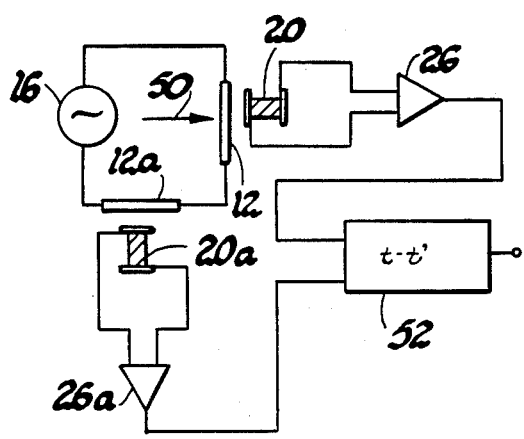
FIG. 8 is a schematic view of still another embodiment of the invention.

(3) At high frequencies $V_o/V_a$ decreases exponentially with increasing frequency. It is desirable that the thickness of the thermally insulating layer and the frequency be chosen so that the sensor is operating in condition (1). Both experimental and theoretical evidence shows that the subject device operates as a mass air flow sensor only in condition (1). FIG. 8 of the above cited paper demonstrates that this condition can be satisfied over a wide frequency range.

Figure 3:
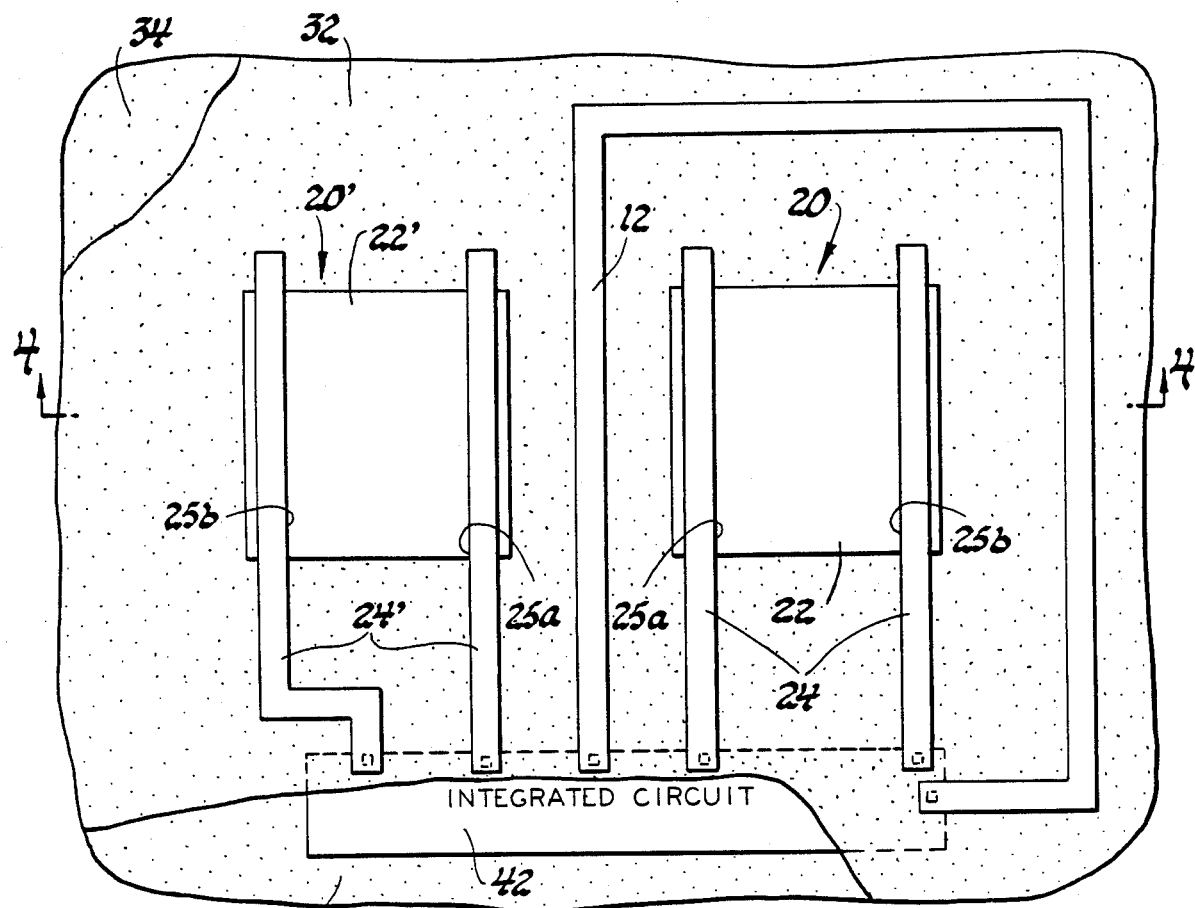
FIG. 3 is a partly broken away plan view of a second embodiment of the fluid flow sensor according to the invention.
Figure 4:
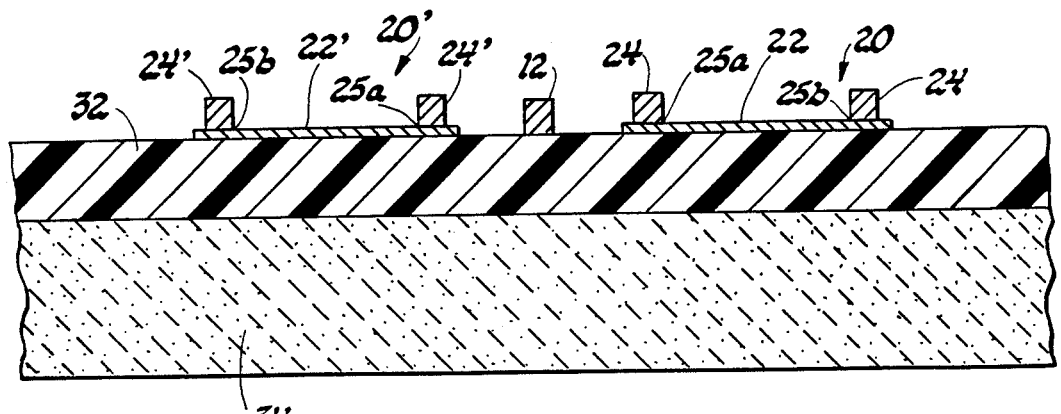
FIG. 4 is a cross-sectional view of the second embodiment taken along line 4—4 of FIG. 3.
Figure 5:
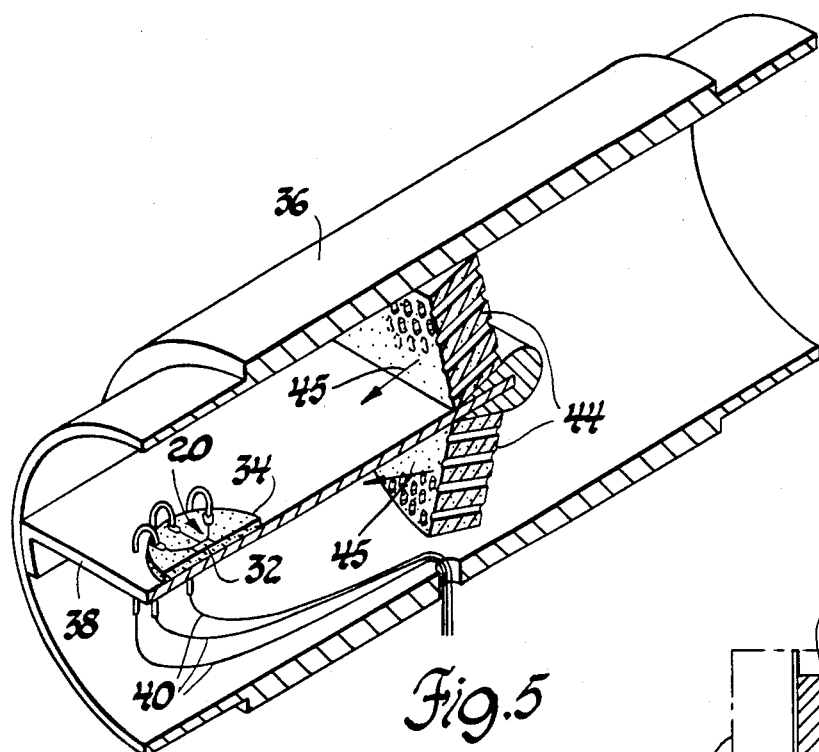
FIG. 5 is a partial cross-sectional view of an air flow meter installation incorporating a sensor according to the invention.

The air flow data of the graph of FIG. 2 was obtained by the specific device shown in FIGS. 3, 4, and 5—except that the integrated circuit 42 was not present, and the upstream detector 20' was not connected to the detector circuit. The circuit was connected in the manner of FIG. 1. The device was operated at 154 Hz thermal oscillation frequency. The device used a 16 micrometer thick polyimide substrate 32 mounted on a silicon base 34. As shown in FIG. 5, an air flow tube 36 having an inner diameter of 6 cm is bisected by a diametrically disposed plate 38 supported by its edges on the tube 36 inner wall. The silicon base 34 of the sensor is a 25 mm diameter silicon wafer mounted on the plate 38. Wire leads 40 extend from the sensor to an aperture in the wall of the tube 36. A pair of air deflectors 44 comprising honeycomb material mounted at an angle upstream of the sensor on either side of the plate 38 direct air flow (shown by arrows 45) at an angle to the plate 38 and to the sensor surface. The silicon base 34 has good thermal conductivity so that it serves as a heat sink for the sensor. Consequently, the overall temperature of the sensor and particularly the maximum source 12 temperature can be minimized for a large thermal oscillation amplitude of the source 12. Other conductive materials such as metals can be used for the base. The silicon base has the further advantage however of optionally including an integrated circuit 42 containing the oscillator 16, the detector amplifier 26, and the timing circuit 30—along with any other desired electronic support for the sensor.

In the embodiment of FIGS. 3 and 4, the substrate 32 supports the thermal oscillation source or resistive strip 12 midway between two thermal oscillation detectors 20 and 20'. The resistive strip 12 is formed of lead and is 56 micrometers wide and 1 micrometer thick. Each detector 20, 20' comprises a lead telluride film 22, 22' having a thickness of 0.2 micrometer and formed as a rectangle about 300 micrometers on a side. Lead conductors 24, 24' parallel to the resistive strip 12, are 7 micrometers wide and 1 micrometer thick and form junctions with the lead telluride film 22 or 22'. For each detector, the junctions 25a and 25b, are spaced apart by 254 micrometers, and the junction 25a nearest the resistive strip 12 is spaced 146 micrometers from the centerline of the strip.

Figure 6:
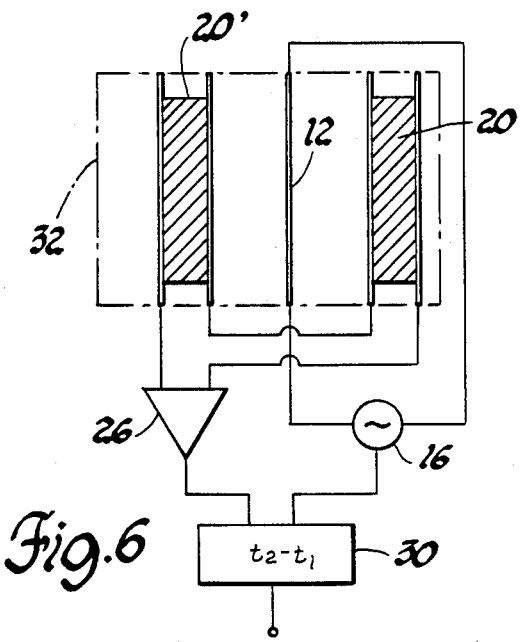
FIG. 6 is a schematic illustration of the FIGS. 3 and 4 embodiment of the invention.

Advantages of using two thermal oscillation detectors 20, 20' which are serially connected to the amplifier 26 as shown in FIG. 6 to cancel equal output voltages of the detectors 20, 20' are to make the sensor insensitive to linear temperature gradients in the air stream and in the substrate, thereby reducing noise or background signals. The detector signal results mainly from temperature oscillations passing through the air thereby increasing the signal from the detector. Detector signals resulting from thermal oscillations passing through the insulating substrate to the detectors tend to cancel since the thermal wave velocity in the substrate should be the same in both directions regardless of the air flow. The effect of the silicon or other thermally conductive base 34 is to reduce the static temperature of the device thereby allowing the maximum heat source temperature to be kept low while increasing the source temperature oscillation amplitude relative to that obtained with a homogeneous substrate.

Figure 7:
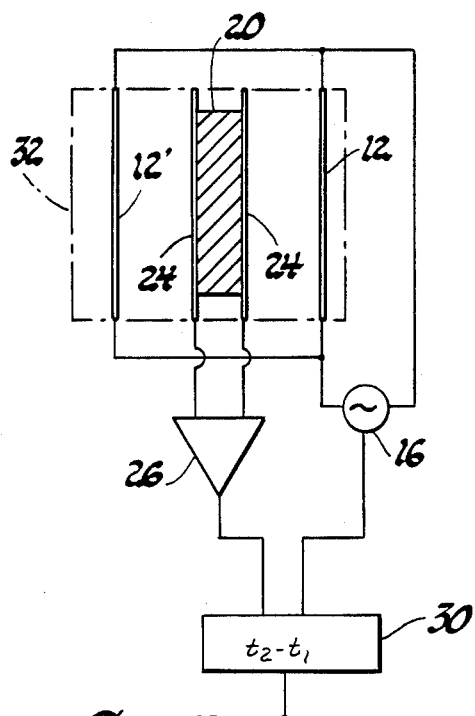
FIG. 7 is a schematic view of an alternative embodiment of the invention.

Another balanced configuration is shown in FIG. 7 wherein two sources of thermal oscillation 12 and 12' are utilized with a single detector 20 midway between the sources. The current oscillator 16 is coupled to both sources 12, 12', whereas the differential amplifier 26 is connected to the two leads 24 of the detector 20. The timing circuit 30 is responsive to the oscillating current as well as the detector 20 output signal. This configuration has many of the advantages exhibited by the configuration of FIG. 6; however, the FIG. 6 configuration is preferred since it does eliminate the linear temperature gradients in the airstream as a source of noise.

The measured phase of the thermal oscillation is a function of fluid temperature, pressure (of gaseous fluid), and substrate surface condition. To compensate for changes in these parameters, a reference phase measurement can be used. This is accomplished by a secondary sensor on the same or a different substrate as the primary sensor and exposed to still fluid or fluid having a different velocity component perpendicular to the source of the secondary sensor. The detected output of the secondary sensor is compared to that of the primary sensor and the phase difference is independent of changes in the temperature, pressure, and surface conditions.

FIG. 8 illustrates a sensor arrangement with a "zero reference" and includes an oscillator 16 in series with a source 12, a detector 20 spaced from the source 12, and a differential amplifier 26 coupled to the detector 20 (as shown in FIG. 1), to measure flow perpendicular to the source 12, as indicated by the arrow 50. A reference phase is generated by a secondary sensor having a source 12a in series with the source 12 and the oscillator 16, and a secondary detector 20a spaced from the source 12a by a spacing equal to that between the source 12 and detector 20. The secondary sensor is oriented 90° relative to the primary sensor so that it is insensitive to air flow measured by the primary sensor. A differential amplifier 26a is coupled across the detector 20a to produce a reference signal. A timing circuit 52 compares the outputs of the amplifiers 26 and 26a to produce a signal representing the resultant phase shift or time shift $(t-t')$ which is a measure of the fluid flow compensated for the effects of fluid temperature, pressure, and surface conditions.

Figure 9:
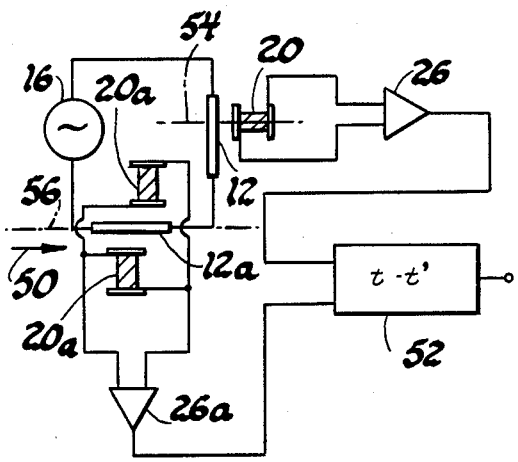
FIGS. 9, 10 and 11 are schematic views of other embodiments of the invention.
Figure 10:
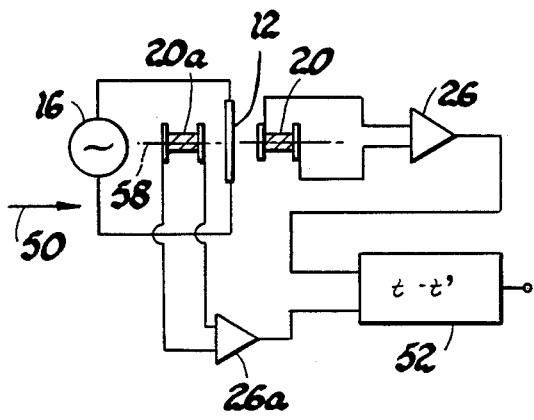
Figure 11:
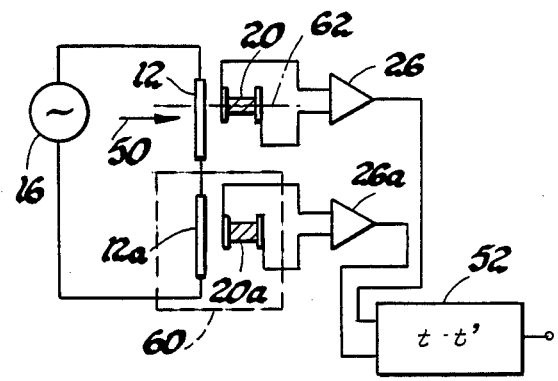

The sensor of FIG. 8 produces accurate results in an operating environment having air flow perpendicular to the source 12, however the secondary sensor is sensitive to small changes in flow direction and will introduce some error into the resultant phase shift measurement. The sensors shown in FIGS. 9-11 are designed to be rather insensitive to small changes in flow direction and thus have a wider application. These sensors, as described herein, are geometrically symmetrical with respect to flow direction. Both the primary and secondary sensor has mirror symmetry about an axis that is parallel to the flow or, in one case, has zero flow for the secondary sensor. For the symmetrical devices a small angle of flow deviation from the "nominal" flow direction parallel to the axis of symmetry produces a small error which is the same magnitude for either direction of deviation. "Small" errors are those which are within the acceptable tolerance range for a given application. In the case of measuring engine induction air a measurement error of 5% may be allowable. For a given deviation angle the error produced at low flow rates is much smaller than at high flow rates. Thus a device designed to allow a 5% error at maximum flow rates will have a much smaller error at the low flow rates experienced during typical engine operation.

A device may be geometrically unsymmetrical yet have the functional attributes of symmetry. The term, "functional symmetry", as used herein means a configuration which yields a result substantially the same as a geometrically symmetrical device. For example, a thermal oscillation source or detector may be laterally offset on one side of the central axis yet the thermal pulse propagation to the detector is the same as for the truly symmetrical case. Thus as used herein, the term "axis of symmetry" is not limited to the case of strict geometrical symmetry but includes an axis parallel to the nominal flow direction of a device having functional symmetry.

FIG. 9 illustrates an improvement on the FIG. 8 sensor arrangement with symmetrical primary and reference sensors and includes an oscillator 16 in series with a source 12, a detector or thermocouple 20 spaced from the source 12, and a differential amplifier 26 coupled to the detector 20 to measure flow perpendicular to the source 12, as indicated by the arrow 50. The primary sensor has an axis of symmetry 54, as do the sensors depicted in FIGS. 1, 3, 6 and 7. A reference phase is generated by a secondary sensor having a source 12a in series with the source 12 and the oscillator 16, and a pair of secondary detectors 20a each spaced from the source 12a by a spacing equal to that between the source 12 and detector 20. The secondary sensor is oriented 90° relative to the primary sensor so that it is insensitive to the nominal air flow perpendicular to the primary sensor. The two detectors 20a are symmetrically spaced from the source 12a with respect to the axis 56 of the source and the detectors are electrically in parallel so that for small deviations in flow direction any phase error in one detector is compensated in the other detector. A differential amplifier 26a is coupled across the parallel detectors 20a to produce a reference signal. A timing circuit 52 compares the outputs of the amplifiers 26 and 26a to produce a signal representing the resultant phase shift or time shift (t−t') which is a measure of the fluid flow compensated for the effects of fluid temperature, pressure, surface conditions, and small variations in flow direction. It is calculated that a device constructed in the fashion of FIG. 9 and operated in the throat of a venturi shaped duct should yield an output error of measured mass air flow of 3.4% for a 5° variation in flow direction at maximum flow rate and a 5% error for a 15° variation in air flow direction at a much lower flow rate.

The sensor shown in FIG. 10 is like that of FIG. 6 but the output circuit is connected to take advantage of the symmetry inherent in the configuration. The axis of symmetry 58 is parallel to the nominal flow direction 50. The detectors 20 and 20' are coupled to differential amplifiers 26 and 26a, respectively, and the amplifier outputs are coupled to a timing circuit 52 which produces a signal representing phase shift or time shift. Fluid flow in the nominal flow direction will affect the phase of each detector signal and the effect is additive. Transverse flow on the other hand will cause substantially offsetting phase variations so that the phase shift is only slightly affected. This configuration measures flow in either direction equally well. While the measured phase shift reveals the flow rate, the phase sign indicates the flow direction. Thus, in effect there is no "primary" and "secondary" sensors since their roles are interchangeable.

FIG. 11 shows a sensor like that of FIG. 1 having an axis of symmetry 62 but it is equipped with a reference sensor which is exposed to the fluid temperature and pressure but is isolated from the fluid velocity. The reference sensor comprises a thermal oscillation source 12a and detector 20a coupled to a differential amplifier 26a. In the case of a mass flow sensor the reference sensor is located in a region 60 of still air. The region 60 may be formed by barriers to fluid flow, for example, or the reference sensor could even be placed on a separate substrate.

In every case of the described FIGS. 9, 10 and 11, the detectors or thermocouples are equally spaced from their respective sources to ensure compensation for the effects of changes in temperature and pressure. In each case the sensor phase shift output is affected only slightly by small variations in flow direction.

It will thus be seen that the fluid flow sensor according to the invention meets the practical requirement of many applications where the operating environment undergoes variations in temperature, pressure, and flow direction and yields useful results within predefined margins on error.

The embodiments of the invention for which an exclusive property or privilege is claimed are defined as follows:

1. A fluid flow sensor for location contiguous to a body of fluid subject to flow to be measured, comprising:
   a thin film substrate having a thermal diffusivity substantially less than that of the fluid and having a thermal conductivity substantially greater than that of the fluid;
   thermal oscillation means on the surface of the substrate for generating thermal oscillations in the fluid, whereby thermal oscillations are propagated through the fluid at a rate dependent on fluid flow to substrate surface locations spaced from the oscillation means;
   primary and reference thermal oscillation detector means on the substrate surface equally spaced from the oscillation means for providing primary and reference output signals corresponding to the thermal oscillations at the detector means, the reference detector means having the same sensitivity to temperature and pressure as the primary detector means;

the oscillation means and the primary detector means having an axis of symmetry parallel to the nominal direction of flow so that the primary detector output signal is substantially insensitive to small changes in flow direction and being arranged for sensing thermal oscillations propagated generally in one direction parallel to the nominal direction of flow;

the oscillation means and reference detector means having an axis of symmetry parallel to the nominal direction of flow so that the reference detector output signal is as insensitive to small changes in flow direction as the primary output signal and being arranged for sensing thermal oscillations propagated in the opposite direction parallel to nominal direction of flow; and signal responsive means coupled to the primary and reference detector means for producing an output correlated to the fluid flow near the substrate surface, and the signal responsive means includes means for compensating for effects of changes in fluid pressure and temperature and small changes in flow direction comprising circuitry for determining the relative phase of the detector outputs.

2. A fluid flow sensor as claimed in claim 1 wherein the thermal oscillation means is a lineal thin film resistor heater perpendicular to the nominal direction of flow and the primary and reference detector means are lineal thin film thermocouples parallel to the heater and spaced equidistantly on opposite sides of the heater.

3. A fluid flow sensor for location contiguous to a body of fluid subject to flow to be measured, comprising:

a thin film substrate having a thermal diffusivity substantially less than that of the fluid and having a thermal conductivity substantially greater than that of the fluid;

thermal oscillation means comprising first and second thermal oscillation sources on the surface of the substrate for generating thermal oscillations in the fluid, whereby thermal oscillations are propagated through the fluid at a rate dependent on fluid flow to substrate surface locations spaced from the oscillation means;

primary and reference thermal oscillation detector means on the substrate surface equally spaced from the oscillation sources for providing primary and reference output signals corresponding to the thermal oscillations at the detector means, the reference detector means having the same sensitivity to temperature and pressure as the primary detector means;

the first oscillation source and the primary detector means having an axis of symmetry parallel to the nominal direction of flow so that the primary detector output signal is substantially insensitive to small changes in flow direction and being arranged for sensing thermal oscillations propagated generally in one direction parallel to the nominal direction of flow;

the second oscillation source and reference detector means having an axis of symmetry parallel to the nominal direction of flow and being arranged for sensing thermal oscillations propagated substantially independently of flow; and signal responsive means coupled to the primary and reference detector means for producing an output correlated to the fluid flow near the substrate surface, and the signal responsive means includes means for compensating for effects of changes in fluid pressure and temperature comprising circuitry for determining the relative phase of the detector outputs.

4. A fluid flow sensor for location contiguous to a body of fluid subject to flow to be measured, comprising:

a thin film substrate having a thermal diffusivity substantially less than that of the fluid and having a thermal conductivity substantially greater than that of the fluid;

thermal oscillation means comprising first and second thermal oscillation sources on the surface of the substrate for generating thermal oscillations in the fluid, whereby thermal oscillations are propagated through the fluid at a rate dependent on fluid flow to substrate surface locations spaced from the oscillation means;

primary and reference thermal oscillation detector means on the substrate surface equally spaced from the oscillation means for providing primary and reference output signals corresponding to the thermal oscillations at the detector means, the reference detector means having the same sensitivity to temperature and pressure as the primary detector means;

the first oscillation source and the primary detector means having an axis of symmetry parallel to the nominal direction of flow so that the primary detector output signal is substantially insensitive to small changes in flow direction and being arranged for sensing thermal oscillations propagated generally in one direction parallel to the nominal direction of flow;

the second oscillation source and reference detector means having an axis of symmetry parallel to the nominal direction of flow and being arranged for sensing thermal oscillations propagated in a direction transverse to the nominal direction of flow so that the detector output is substantially insensitive to small changes in flow direction; and signal responsive means coupled to the primary and reference detector means for producing an output correlated to the fluid flow near the substrate surface, and the signal responsive means includes means for compensating for effects of changes in fluid pressure and temperature comprising circuitry for determining the relative phase of the detector outputs.

5. A fluid flow sensor as claimed in claim 4 wherein the oscillation means comprises first and second lineal thin film resistor heaters perpendicular to and parallel to the nominal direction of flow respectively, and the primary detector means comprises a lineal thin film thermocouple parallel to the first heater, and the reference detector means comprises a pair of electrically connected lineal thin film thermocouples parallel to the second heater for producing the reference output signal which is insensitive to small changes in flow direction, all the thermocouples being spaced equidistantly from their respective heaters.

6. A fluid flow sensor for location contiguous to a body of fluid subject to flow to be measured, comprising:

a thin film substrate having a thermal diffusivity substantially less than that of the fluid and having a thermal conductivity substantially greater than that of the fluid;

thermal oscillation means on the surface of the substrate for generating thermal oscillations in the fluid, whereby thermal oscillations are propagated through the fluid at a rate dependent on fluid flow to substrate surface locations spaced from the oscillation means;

primary and reference thermal oscillation detector means on the substrate surface equally spaced from the oscillation means for providing primary and reference output signals corresponding to the thermal oscillations at the detector means, the reference detector means having the same sensitivity to temperature and pressure as the primary detector means;

the oscillation means and the primary detector means having an axis of symmetry parallel to the nominal direction of flow so that the primary detector output signal is substantially insensitive to small changes in flow direction and being arranged for sensing thermal oscillations propagated generally parallel to the nominal direction of flow;

the oscillation means and reference detector means having an axis of symmetry parallel to the nominal direction of flow so that the reference detector output signal is at least as insensitive to small changes in flow direction as the primary output signal and being arranged for sensing thermal oscillations propagated in a direction parallel to nominal direction of flow; and signal responsive means coupled to the primary and reference detector means for producing an output correlated to the fluid flow near the substrate surface, and the signal responsive means includes means for compensating for effects of changes in fluid pressure and temperature comprising circuitry for determining the relative phase of the detector outputs.

7. A fluid flow sensor for location contiguous to a body of fluid subject to flow to be measured, comprising:

a thin film substrate having a thermal diffusivity substantially less than that of the fluid and having a thermal conductivity substantially greater than that of the fluid;

thermal oscillation means on the surface of the substrate for generating thermal oscillations in the fluid, whereby thermal oscillations are propagated through the fluid at rate dependent on fluid flow to substrate surface locations spaced from the oscillation means;

primary and reference thermal oscillation detector means on the substrate surface equally spaced from the oscillation means for providing primary and reference output signals corresponding to the thermal oscillations at the detector means, the reference detector means having the same sensitivity to temperature and pressure as the primary detector means;

the oscillation means and the primary detector means having an axis of symmetry parallel to the nominal direction of flow so that the primary detector output signal is substantially insensitive to small changes in flow direction and being arranged for sensing thermal oscillations propagated generally parallel to the nominal direction of flow;

the oscillation means and reference detector means having an axis of symmetry parallel to the nominal direction of flow so that the reference detector output signal is at least as insensitive to small changes in flow direction as the primary output signal and being arranged for sensing thermal oscillations propagated in a direction perpendicular to nominal direction of flow; and signal responsive means coupled to the primary and reference detector means for producing an output correlated to the fluid flow near the substrate surface, and the signal responsive means includes means for compensating for effects of changes in fluid pressure and temperature comprising circuitry for determining the relative phase of the detector outputs.

* * * * *